Patented Aug. 3, 1926.

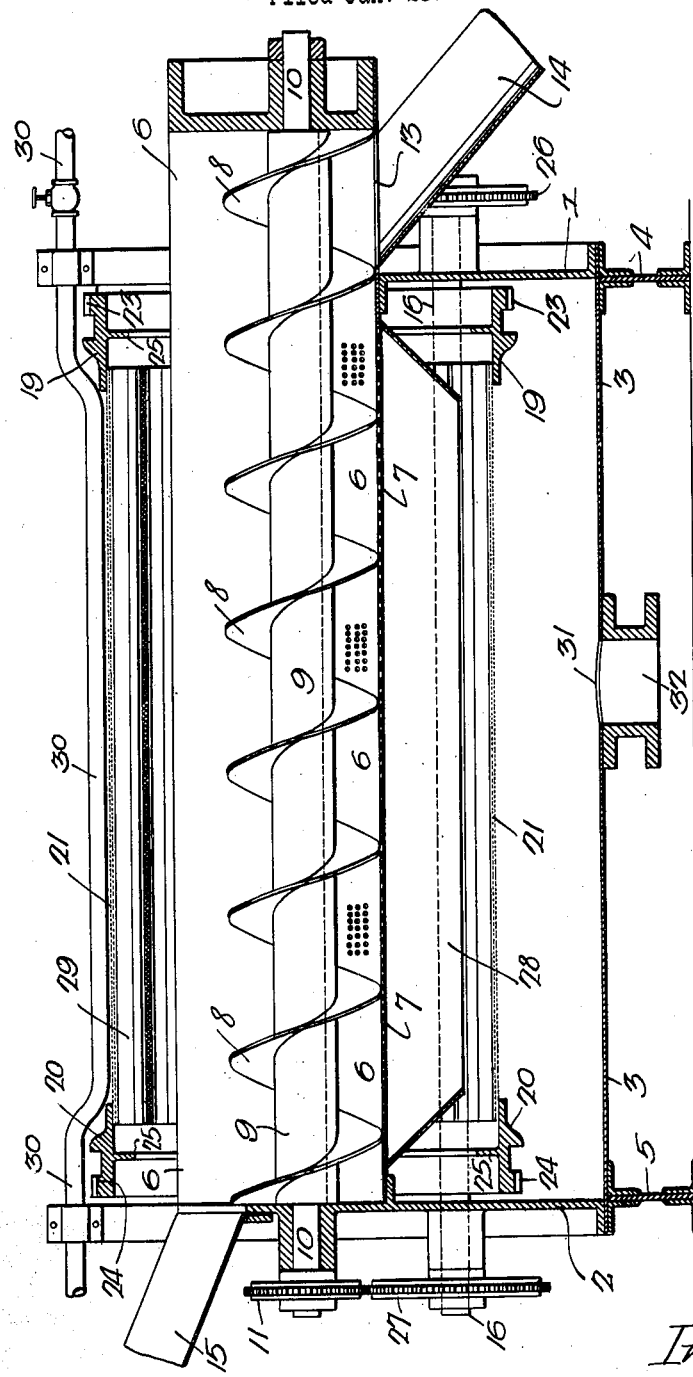

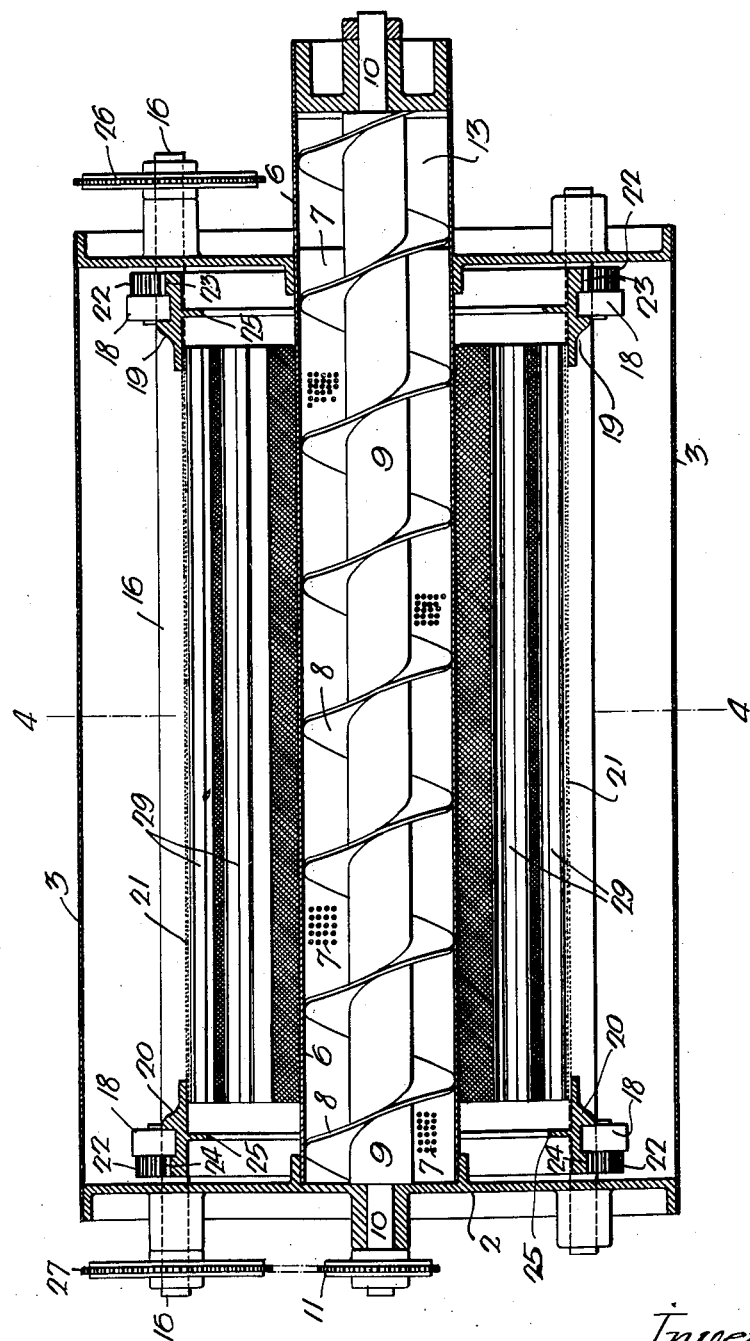

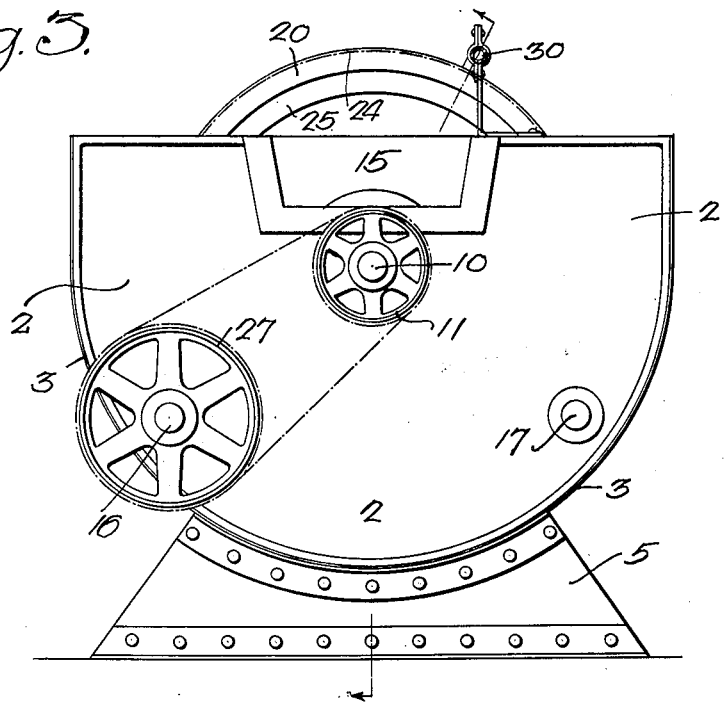
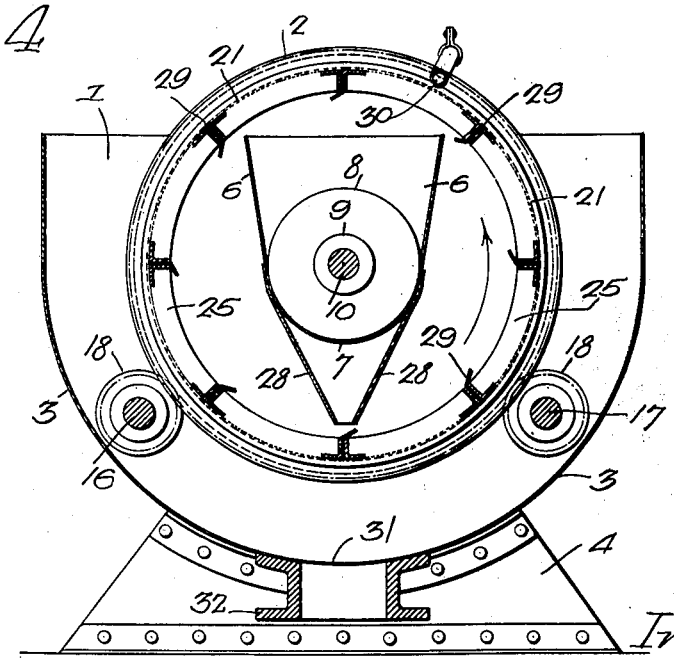

1,594,999

UNITED STATES PATENT OFFICE.

MARTIN E. CARTER, OF PHILADELPHIA, PENNSYLVANIA.

JUICE STRAINER.

Application filed January 23, 1924. Serial No. 688,034.

One object of my invention is to provide a machine of relatively simple construction which may be inexpensively made and operated, for straining raw sugar juice with a view of separating therefrom the trash or cane fibre.

It is further desired to provide a juice strainer capable of use for destroying by heat the ferment-producing materials and other growths commonly found in raw sugar juice, and which shall so treat the latter as to minimize the liability of inversion occurring in the juice tanks.

A further object of my invention is to provide a machine by which it shall be possible to commercially strain juice or other liquid to remove therefrom a high percentage of finely divided solid material therein contained, for example, to a fineness up to 100 mesh,—the construction being such as to remove from raw sugar juice by far the greater portion of bagacillio usually passed by mill strainers.

Another object of my invention is to provide a strainer which shall be capable of highly clarifying raw sugar juice and that at a relatively rapid rate, which shall require a reduced amount of steam in the juice heaters, shall necessitate the use of less lime and shall materially reduce the filter press work required, at the same time leaving the machines which handle the juice after it has been delivered from the mill, in a cleaner condition than has hitherto been possible.

Fig. 1 is a longitudinal vertical section of a juice strainer constructed in accordance with my invention;

Fig. 2 is a plan of the device shown in Fig. 1;

Fig. 3 is an end elevation of a juice strainer; and,

Fig. 4 is a vertical section on the line 4—4, Fig. 2.

In the accompanying drawings, 1 and 2 represent the heads of a substantially horizontal tank having a body 3 of approximately semi-cylindrical form, supported at its ends on brackets or frames 4 and 5 constituting feet. Mounted in this tank and extending longitudinally thereof, is a trough 6 open at its top, having a semi-cylindrically curved bottom 7 of perforated brass or copper,—there being, for example, 100 perforations to the square inch and each of said perforations being of about one-sixteenth of an inch in diameter. This trough is supported by and extends horizontally between the two heads 1 and 2 which are preferably flanged to suitably carry it. Its curved bottom 7 is preferably substantially coaxial with said heads, being designed to receive and cooperate with a helical conveyor 8 including a suitable supporting core 9 carried by and driven from a shaft 10. The latter is journaled in suitable bearings in the heads 1 and 2 and at one end has fixed to it a chain wheel 11 by which it is rotated. At one end of the machine the trough 6 extends through and beyond the head 1, having an outlet opening 13 in its perforated bottom through which solid material is delivered to a discharge chute 14. The material to be treated is delivered to the trough 6 through an inlet chute 15 in the head 2. Of the material delivered by the chute 15, the liquid passes through the perforated bottom 7 of the trough 6, while the solid material, which is incapable of passing through the openings of said bottom, is carried by the conveyor 8 to the opening 13 and discharged through the chute 14.

The two heads 1 and 2 are provided with bearings for two parallel shafts 16 and 17 extending through its lower portion parallel with the shaft 10 and each of these two lower shafts is provided with a pair of supporting rollers 18 adjacent its opposite ends designed to fit into circular guideways formed in two head rings 19 and 20 at the opposite ends of a strainer cylinder 21. Said shafts are so positioned that this cylinder is substantially coaxial with the shaft 10 and in addition each shaft has fixed to it a pair of gears 22—22 respectively meshing with the teeth of two gears 23 and 24 formed integral with or rigidly fixed to the head rings 19 and 20 respectively. Said latter rings are rotatably mounted immediately adjacent the two heads 1 and 2 respectively, and each of them has an inwardly extending rib or flange 25. The shaft 16 preferably has fixed to one end a driving pulley or wheel 26 and at its opposite end has a chain wheel 27 operatively connected to the chain wheel 11 on the shaft 10. Thus when said shaft 16 is rotated by power applied to the wheel or pulley 26, the gears 22 thereon turn the strainer cylinder and at the same time drive the chain wheels 27 and 11, turning the conveyor shaft 10 and the conveyor 8.

As shown in Fig. 4, the strainer cylinder comprises a series of parallel angle irons 29 connecting the head rings 19 and 20 and having mounted on them either a suitably perforated plate of sheet metal such as brass or a wire cloth backed by rolled brass wire backing with about one inch squared mesh.

Extending parallel with the lines of the surface of the strainer cylinder is a steam spray pipe 30 extending immediately adjacent its perforated surface and having formed in it suitable delivery holes, for example one-eighth of an inch in diameter, spaced on three-quarter inch centers.

As shown in Figs. 1 and 4, the trough 6 below its perforated bottom 7 has an extension formed by two side members 28—28 inclined toward each other and terminating a short distance apart immediately adjacent the path of movement of the inwardly projecting angles 29 of the strainer cylinder. The main tank 1—2—3 has an outlet opening 31 preferably adjacent the middle of its bottom connected by a fitting 32 to any suitable conduit or receptacle.

Under conditions of operation, power is applied to the shaft 16 through the wheel or pulley 26, thus turning the cylindrical strainer and the conveyor 8. Raw cane juice or any other liquid to be treated is then delivered to the machine through the inlet conduit 15 to the trough 6 in which as above noted, larger particles of solid material are retained and delivered by the conveyor 8 to the outlet opening 13 and the delivery chute 14. The juice, still containing the finer particles of bagacillio, at once passes through the perforated bottom 7 of the trough and is delivered to the wire cloth constituting the inside surface of the strainer cylinder. Said cloth retains practically all of the solid material, more particularly the fine fibres usually practically inseparable from raw juice together with any other solid or gummy material which may have passed through the perforated bottom 7 of the trough 6. This retained solid material is carried up by the angles 29 as the strainer cylinder is rotated and is delivered by these into the open top of the trough 6, where it is carried by the conveyor 8 to the discharge opening 13.

The pipe 30 is preferably supplied with steam under pressure during the operation of the machine and is so positioned that it directs steam jets against the wire cloth of the strainer cylinder from the outside thereof and over the open top of the trough 6 so as to forcibly dislodge therefrom any material which might otherwise adhere to or otherwise be held by the screen or cloth surface of the strainer cylinder. At the same time, the steam maintains the strainer cylinder and the interior of the machine in a sterile condition so as to completely prevent fermentation of the juice and also avoid the formation of the peculiar growths which have hitherto exerted an objectionable clogging action on apparatus for treating sugar juices. Since the screen or cloth of the strainer cylinder is thus automatically maintained in a perfectly clean and unclogged condition, it is permissible for it to be of extremely fine mesh so that the strained juice delivered through the outlet fitting 32 contains but a relatively small amount of fibrous material and permits the machines for subsequently treating the sugar juice to be run in a cleaner condition and at a higher speed than would otherwise be possible. The machine is obviously continuous in its action and being of relatively simple construction, has no parts likely to require frequent inspection or repair, especially since it automatically maintains itself in a clean, sterile condition.

I claim:

1. The combination in a strainer for sugar juice, of a tank, a horizontal cylindrical screen rotatably mounted in the tank, a perforated trough extending longitudinally into the rotatable screen, means whereby raw sugar juice to be treated is delivered into the trough, and means located adjacent the upper part of the screen for sterilizing the said screen as it is rotated, thereby preventing the accumulation of ferment producing materials thereon.

2. The combination in a strainer for sugar juice, of a tank, a horizontal cylindrical screen rotatably mounted in the tank, a perforated trough extending longitudinally into the rotatable screen, means whereby raw sugar juice to be treated is delivered into the trough, and means arranged longitudinally along the upper part of the screen for directing jets of steam against the exterior of the screen as it is rotated, thereby mechanically removing solid matter from the screen mesh and at the same time sterilizing the screen to prevent the accumulation of ferment producing materials thereon.

3. The combination in a juice strainer, of a tank, a horizontal cylindrical screen rotatably mounted in the tank, a perforated trough extending longitudinally into the rotatable screen, means whereby material to be treated may be delivered into the trough, a conveyor in the trough for carrying solid matter therealong, and inward projecting blades on the cylindrical screen adapted to engage solid material on the screen and deliver it into the trough.

4. The combination in a juice strainer, of a tank, a horizontal cylindrical screen rotatably mounted in the tank, a perforated trough extending longitudinally into the rotatable screen, means whereby material to be treated may be delivered into the trough, a conveyor in the trough for carrying solid matter therealong, converging walls depending from the sides of the trough and forming a spout for confining and directing liquids and solid matter discharged through the bottom of the trough, and inward projecting blades on the cylindrical screen arranged to pass close to the bottom of the spout to receive solid matter directly therefrom, the said blades thereafter discharging the said solid matter into the trough.

5. The combination of a horizontally elongated tank, comprising two heads and a body; two shafts extending through said tank and journaled in said head; rollers on the shafts; at least one gear on one of the shafts; a cylindrical screen rotatably carried on said rollers; gear on the screen meshing with said gear on one of the shafts; with a stationary perforated trough extending within the screen; and means for delivering to said trough liquid to be strained.

6. The combination of a tank comprising two heads; a body extending between the same; two parallel longitudinal shafts journaled in said heads; two pairs of rollers on said shafts, respectively; a rotary screen comprising two grooved head rings rotatably mounted on the rollers; at least one gear for said screen bodily rotatable therewith; a pinion on one of the shafts for driving said gear; and a trough extending through the screen.

La Romana, Dominican Republic, Dec. 13, 1923.

MARTIN E. CARTER.